(12) United States Patent
Eaton

(10) Patent No.: US 10,030,423 B2
(45) Date of Patent: Jul. 24, 2018

(54) MOVABLE JOINT

(71) Applicant: Robert Bosch GmbH, Stuttgart (DE)

(72) Inventor: Robert Lee Eaton, Shakopee, MN (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/299,499

(22) Filed: Oct. 21, 2016

(65) Prior Publication Data

US 2017/0191296 A1    Jul. 6, 2017

Related U.S. Application Data

(60) Provisional application No. 62/273,045, filed on Dec. 30, 2015.

(51) Int. Cl.
| | |
|---|---|
| *E05D 11/00* | (2006.01) |
| *H04R 1/08* | (2006.01) |
| *E05D 11/10* | (2006.01) |
| *F16L 3/015* | (2006.01) |
| *E05D 11/08* | (2006.01) |
| *E05D 3/02* | (2006.01) |
| *F21V 21/30* | (2006.01) |
| *F21V 21/26* | (2006.01) |

(Continued)

(52) U.S. Cl.
CPC ............ *E05D 11/0081* (2013.01); *E05D 3/02* (2013.01); *E05D 11/08* (2013.01); *E05D 11/1007* (2013.01); *F16L 3/015* (2013.01); *H04R 1/08* (2013.01); *H04R 1/083* (2013.01); *F16M 11/10* (2013.01); *F21V 21/26* (2013.01); *F21V 21/28* (2013.01); *F21V 21/30* (2013.01)

(58) Field of Classification Search
CPC ............... F16M 11/10; F16M 11/2021; F16M 2200/024; F16M 11/18; F21V 21/26; F21V 21/30; F21V 27/00; F21V 1/26; H04R 1/08; H04R 1/083; H04R 1/222; H04R 1/02; H01R 1/08; E05D 11/0081; E05D 11/1007; E05D 3/02
USPC ......... 248/121, 160, 284.1, 328; 403/84, 93, 403/96, 157; 381/91, 122, 361, 362, 363; 362/427; 173/162.2, 171, 217; 174/86
See application file for complete search history.

(56) References Cited

U.S. PATENT DOCUMENTS

| | | | |
|---|---|---|---|
| 2,188,150 A | | 1/1940 | Malat |
| 2,434,986 A | * | 1/1948 | Bremer .................... B62B 7/08 |
| | | | 248/124.1 |

(Continued)

*Primary Examiner* — Stanton L Krycinski
*Assistant Examiner* — Taylor L Morris
(74) *Attorney, Agent, or Firm* — Michael Best & Friedrich LLP

(57) ABSTRACT

A movable joint for an electronic device includes a first joint component having a body portion that encloses a wire lead and a tab portion coupled to the body portion, and a second joint component having a body portion that encloses the wire lead and a tab portion coupled to the body portion. The tab portion of the second joint component engages the tab portion of the first joint component with a pivot member interconnecting the tab portions to enable selective movement between the first and second joint components. The wire lead spans the movable joint between the engaged tab portions of the first and second joint components. At least one of the tab portions includes a recessed channel, the recessed channel at least partially containing the wire lead.

20 Claims, 6 Drawing Sheets

(51) Int. Cl.
*F16M 11/10* (2006.01)
*F21V 21/28* (2006.01)

(56) References Cited

U.S. PATENT DOCUMENTS

| | | | | |
|---|---|---|---|---|
| 3,201,530 A * | 8/1965 | Levy | | H04R 1/08 |
| | | | | 381/122 |
| 3,324,254 A * | 6/1967 | Shaw | | H04R 1/08 |
| | | | | 248/121 |
| 3,584,793 A * | 6/1971 | Ilzig | | F16M 11/2021 |
| | | | | 362/404 |
| 4,008,910 A * | 2/1977 | Roche | | F21V 21/28 |
| | | | | 174/86 |
| 4,213,591 A | 7/1980 | Jaakkola | | |
| 4,494,177 A | 1/1985 | Matthews | | |
| 4,522,270 A * | 6/1985 | Kishi | | B23B 45/001 |
| | | | | 173/170 |
| 4,545,555 A | 10/1985 | Koch | | |
| 4,700,017 A * | 10/1987 | Morand | | H02G 3/06 |
| | | | | 174/86 |
| 4,748,671 A | 5/1988 | Wiegel | | |
| 4,802,605 A * | 2/1989 | Salmon | | G06F 1/1616 |
| | | | | 16/267 |
| 4,911,510 A * | 3/1990 | Jenkins | | G02B 6/4439 |
| | | | | 174/86 |
| 4,912,349 A * | 3/1990 | Chang | | B25F 5/02 |
| | | | | 173/170 |
| 5,263,507 A * | 11/1993 | Chuang | | E04H 15/46 |
| | | | | 135/140 |
| 5,339,233 A | 8/1994 | Yang | | |
| 5,429,481 A * | 7/1995 | Liu | | F04D 29/601 |
| | | | | 403/93 |
| 5,541,822 A * | 7/1996 | Bamber | | F21L 4/045 |
| | | | | 362/190 |
| 5,661,942 A * | 9/1997 | Palmer | | E04H 15/48 |
| | | | | 135/156 |
| 5,690,419 A * | 11/1997 | Siems | | F21V 21/02 |
| | | | | 362/269 |
| 5,713,662 A * | 2/1998 | Kira | | F21V 21/28 |
| | | | | 362/269 |
| 6,161,948 A * | 12/2000 | Hagen | | F16M 11/10 |
| | | | | 362/267 |
| 6,273,383 B1 | 8/2001 | Oddsen, Jr. | | |
| 6,343,406 B1 * | 2/2002 | Yeh | | E05D 11/1007 |
| | | | | 16/328 |
| 6,459,801 B1 * | 10/2002 | Ming-Cheng | | H04R 1/08 |
| | | | | 381/363 |
| 6,550,734 B1 | 4/2003 | Spadea | | |
| 6,594,371 B2 | 7/2003 | Wetzel et al. | | |
| 6,877,709 B2 * | 4/2005 | March | | B60R 1/04 |
| | | | | 248/549 |
| 6,902,200 B1 * | 6/2005 | Beadle | | F16C 11/04 |
| | | | | 285/185 |
| 6,966,679 B2 * | 11/2005 | Matts | | F16C 11/103 |
| | | | | 362/267 |
| 6,984,054 B2 * | 1/2006 | Lai | | F21L 14/026 |
| | | | | 362/109 |
| 7,281,591 B2 * | 10/2007 | Bone | | H01R 35/02 |
| | | | | 173/170 |
| 7,390,110 B2 * | 6/2008 | Katz | | F21V 21/30 |
| | | | | 362/382 |
| 7,451,957 B2 | 11/2008 | Nguyen | | |
| 7,574,942 B2 * | 8/2009 | Miyazaki | | B25J 19/0029 |
| | | | | 74/490.01 |
| 7,591,604 B2 * | 9/2009 | Roberts | | B25F 5/02 |
| | | | | 16/326 |
| 7,896,568 B2 * | 3/2011 | Atkinson | | E05D 5/125 |
| | | | | 248/160 |
| 7,909,490 B2 * | 3/2011 | Chou | | F21V 21/26 |
| | | | | 362/188 |
| 7,971,840 B2 * | 7/2011 | Hirschhorn | | F16M 11/041 |
| | | | | 248/123.11 |
| 8,087,797 B2 * | 1/2012 | Pelletier | | F21L 2/00 |
| | | | | 362/190 |
| 8,196,883 B2 | 6/2012 | Hirschhorn | | |
| 8,311,262 B2 * | 11/2012 | Kulchy | | F16M 11/08 |
| | | | | 181/150 |
| 8,360,621 B2 * | 1/2013 | Avila | | F21V 21/28 |
| | | | | 362/147 |
| 2001/0030683 A1 * | 10/2001 | Howell | | E04B 9/006 |
| | | | | 348/61 |
| 2003/0035561 A1 * | 2/2003 | Hsieh | | H04R 1/08 |
| | | | | 381/361 |
| 2003/0075658 A1 * | 4/2003 | Beissel, Jr. | | F16M 11/10 |
| | | | | 248/284.1 |
| 2004/0179891 A1 * | 9/2004 | Watkins | | F16C 11/10 |
| | | | | 403/96 |
| 2008/0253601 A1 * | 10/2008 | Hilderman | | H04R 1/026 |
| | | | | 381/363 |
| 2009/0097235 A1 * | 4/2009 | Chambers | | F21V 33/0052 |
| | | | | 362/110 |
| 2010/0254559 A1 * | 10/2010 | Heil | | H04R 1/08 |
| | | | | 381/361 |
| 2011/0149582 A1 * | 6/2011 | McKee | | F16M 11/10 |
| | | | | 362/382 |
| 2014/0367137 A1 | 12/2014 | Leung | | |
| 2015/0337579 A1 * | 11/2015 | Jacobs | | G06F 1/1681 |
| | | | | 361/679.55 |
| 2016/0053934 A1 * | 2/2016 | Hennessey | | F16M 11/28 |
| | | | | 248/124.2 |
| 2017/0205027 A1 * | 7/2017 | Mitchell | | F16M 13/02 |

* cited by examiner

MOVABLE JOINT

RELATED APPLICATIONS

This application claims the benefit of U.S. Provisional Patent Application No. 62/273,045 filed on Dec. 30, 2015, the entire content of which is hereby incorporated by reference herein.

BACKGROUND

The present invention relates to movable joints for electronic devices.

SUMMARY

In one aspect, the invention provides a movable joint for an electronic device. The joint includes a first joint component having a body portion that encloses a wire lead and a tab portion coupled to the body portion, and a second joint component having a body portion that encloses the wire lead and a tab portion coupled to the body portion. The tab portion of the second joint component engages the tab portion of the first joint component with a pivot member interconnecting the tab portions to enable selective movement between the first and second joint components. The wire lead spans the movable joint between the engaged tab portions of the first and second joint components. At least one of the tab portions includes a recessed channel, the recessed channel at least partially containing the wire lead.

In another aspect, the invention provides a microphone having a movable joint. The microphone includes a base having a body portion that encloses a wire lead and a tab portion coupled to the body portion, and a head having a body portion that encloses the wire lead and a tab portion coupled to the body portion. The tab portion of the head engages the tab portion of the base with a pivot member interconnecting the tab portions of the base and the head to create the moveable joint to enable selective movement between the base and the head. The wire lead spans the movable joint between the engaged tab portions of the base and the head. The tab portion of the base includes a recessed channel and the tab portion of the head includes another recessed channel, the recessed channels at least partially containing the wire lead.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
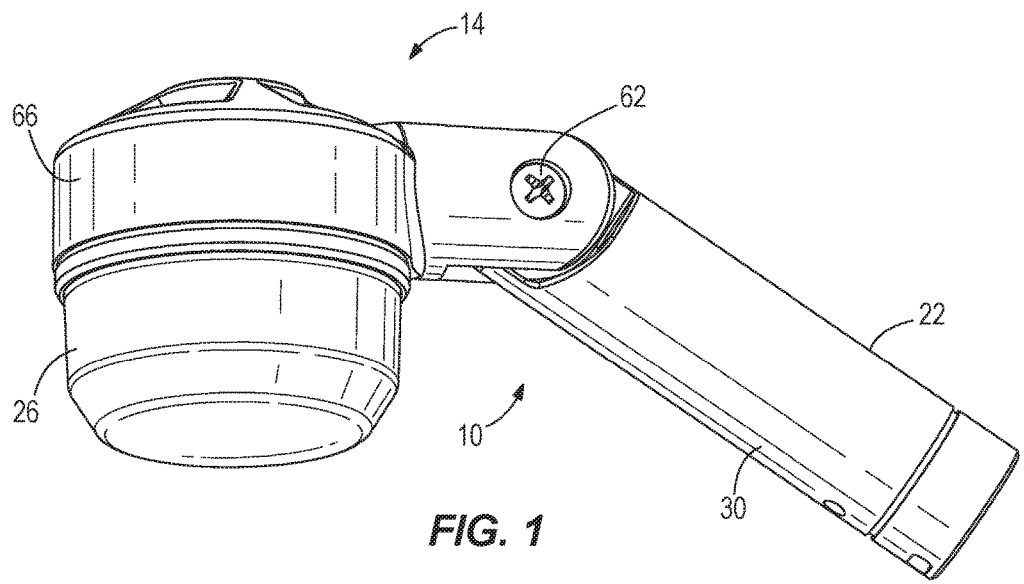
FIG. 1 is perspective view of an electronic device having a movable joint embodying the invention.

FIG. 1 illustrates a first embodiment of a movable hinge or joint 10 of an electronic device 14. The illustrated electronic device is an audio microphone, however, the invention is capable of being practiced with other electronic devices (e.g., lights, cameras, sensors, speakers, etc.) in which a movable joint is present. It is common for such electronic devices 10 to have wire leads 18 (see FIG. 7) that must span the movable joint 10 in order to provide power or other signal transmission across the joint 10 and between the two movable components of the joint 10. The present invention provides an improved joint 10 in which provisions exist to guide, protect, and hide the wire leads across the movable joint 10, while at the same time maintaining a slim overall joint profile.

Referring specifically to FIGS. 1-7, the illustrated microphone 14 is an Electro-Voice ND44 microphone with the joint 10 being formed between a first joint component or base 22 and a second joint component or head 26. The illustrated base 22 has a body portion 30, which is formed as a generally cylindrical tube having a hollow interior 34 (see FIG. 4), and which encloses the wire lead. The base 22 further includes a tab portion 38 coupled to the body portion 30. The tab portion 38 is sized and configured to mate with the head 26 to form the joint 10, as will be described further below. The illustrated tab portion 38 is narrower than the body portion 30 and takes the form of a generally planar wall having oppositely-facing first and second sides 42 (only one side 42 is shown). The distal end of the tab portion 38 is rounded or arcuate to facilitate rotation of the joint 10.

Figure 2:
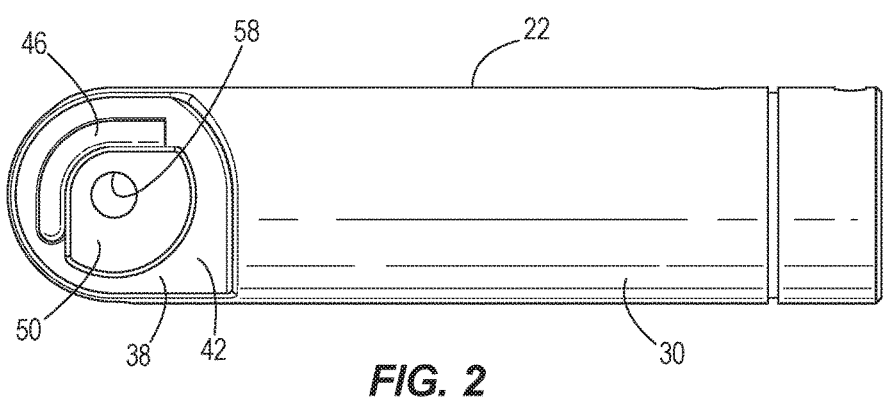
FIG. 2 is a side view of a first joint component of the movable joint of FIG. 1
Figure 3:
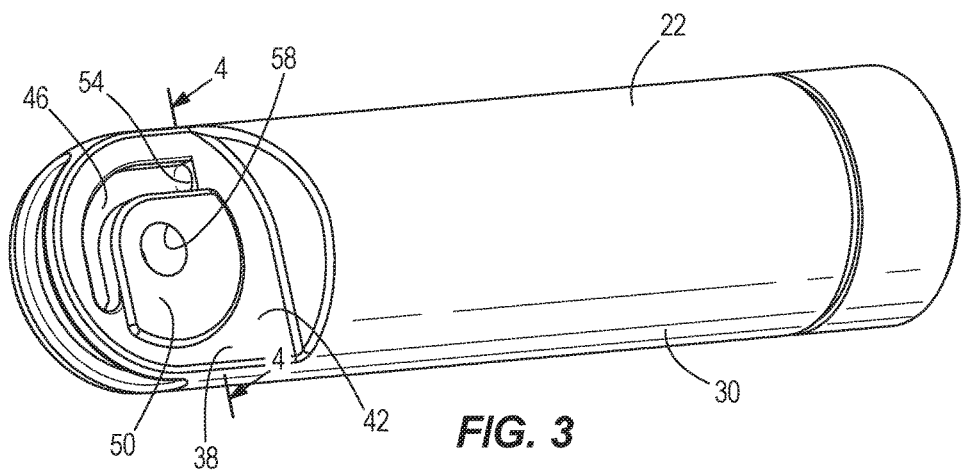
FIG. 3 is a perspective view of the first joint component of FIG. 2.
Figure 4:
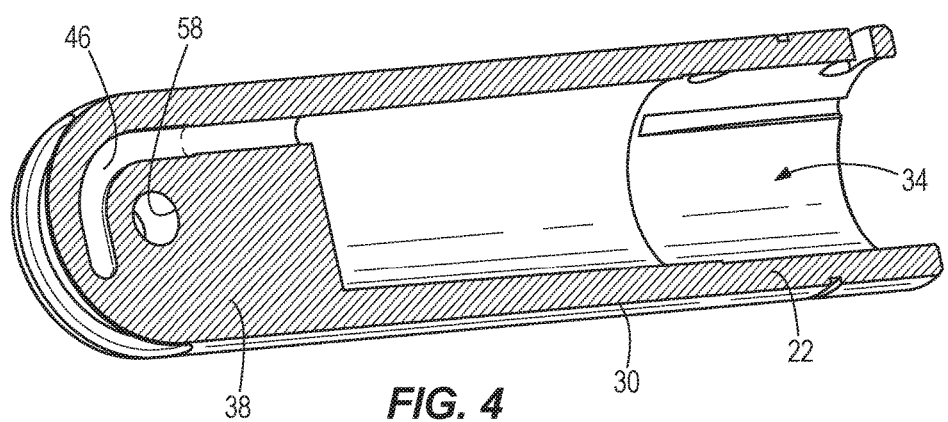
FIG. 4 is a section view of the first joint component of FIG. 2.

As best shown in FIGS. 2-4, at least one side 42 of the tab portion 38 includes a recessed channel 46 formed therein. The recessed channel 46 is formed into or defined by the surface of the side 42 and is sized to receive or partially receive the wire lead 18. The recessed channel 46 is differentiated from the hollow interior 34 of the body portion 30, which is simply the much larger hollow area defined within the tubular body portion 30. The tab portions 38 can be molded plastic or cast metal. As shown in FIGS. 2-4, the recessed channel 46 is arcuate in shape and is shown to form approximately a ninety-degree angle or bend about a projection 50 extending from the side 42. The projection 50 provides a thickened region that strengthens the tab portion 38, and also provides a lateral offset from the remainder of the side 42 and from the recessed channel 46. The end of the recessed channel 46 closest to the body portion 30 communicates with an aperture or hole 54 that provides access for the wire lead to extend between the hollow interior 34 of the body portion 30 and the recessed channel 46. Therefore, the wire lead can extend from the hollow interior 34, through the aperture 54, and into the recessed channel 46. The depth of the recessed channel in the side 42 can vary depending on the gauge and/or number of wire leads spanning the joint 10. Additionally, while the recessed channel 46 is illustrated as being arcuate/semi-circular in cross-section, the bottom of the channel can alternatively be planar with the sidewalls of the channel extending orthogonally from the planar bottom wall.

The tab portion 38 also includes a hole 58 for receiving a pivot member 62. The illustrated hole 58 passes though the projection 50. As seen in FIG. 1, the illustrated pivot member takes the form of a screw 62. The pivot member 62 provides the structure about which the base 22 and the head 26 pivot, swivel, or move relative to one another.

Figure 5:
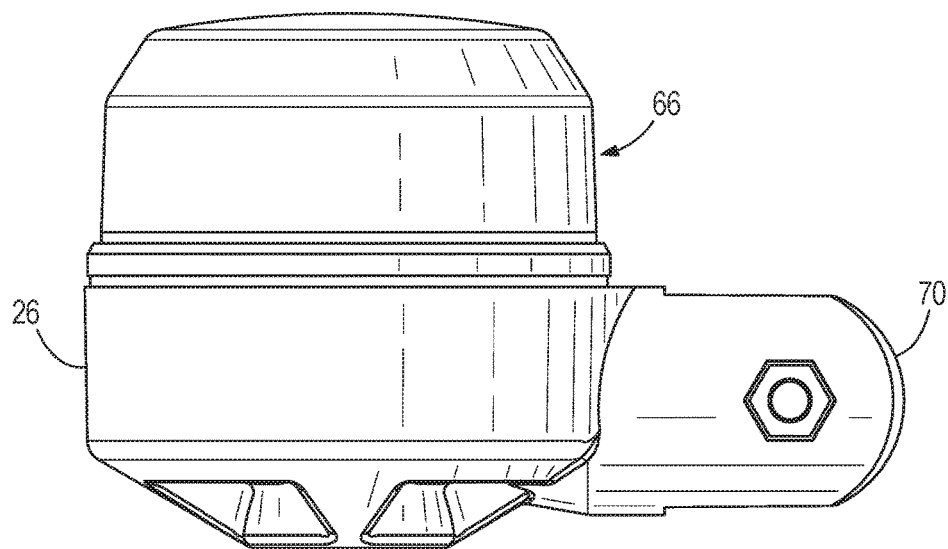
FIG. 5 is a side view of a second joint component of the movable joint of FIG. 1.
Figure 6:
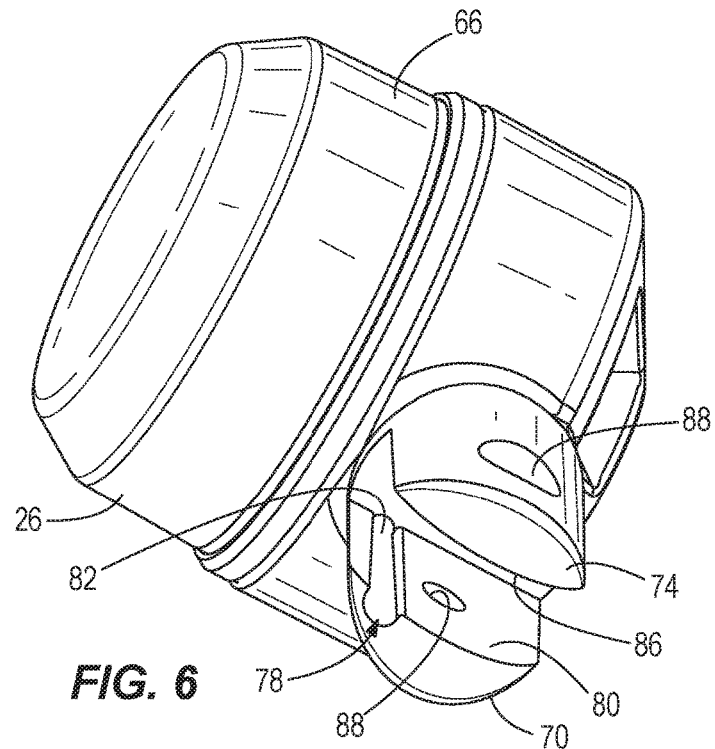
FIG. 6 is a perspective view of the second joint component of FIG. 5.
Figure 8:
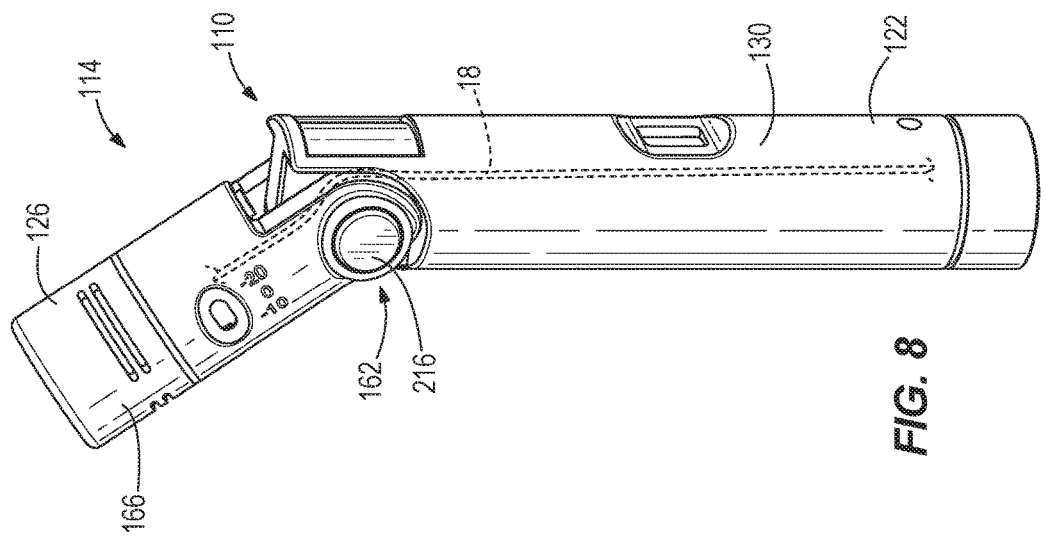
FIG. 8 is perspective view of another electronic device having a movable joint embodying the invention.

Referring now to FIGS. 1, 5, and 6, the head 26 includes a body portion 66, which in the illustrated embodiment, contains the active components of the microphone 14. The head 26 further includes at least one, and as illustrated, two tab portions 70, 74 coupled to the body portion 66. The first tab portion 70 of the head 26 includes a recessed channel 78 formed on an inwardly-facing surface 80 that engages the side 42 of the tab portion 38 containing the recessed channel 46. The recessed channel 78 is formed into or defined by the surface 80 and is sized to receive or partially receive the wire lead 18. The recessed channel 78 is differentiated from the hollow interior of the body portion 66, which is simply the much larger hollow area containing the active components of the microphone 14. The recessed channel 78 is illustrated as being linear or straight, however, curves or bends in the recessed channel 78 may be used depending on the joint 10. The end of the recessed channel 78 closest to the body portion 66 communicates with an aperture or hole 82 that provides access for the wire lead to extend between the hollow interior (not shown) of the body portion 66 and the recessed channel 78. Therefore, the wire lead can extend from the hollow interior of the head 26, through the aperture 82, and into the recessed channel 78. The depth of the recessed channel 78 can vary depending on the gauge and/or number of wire leads spanning the joint 10. Additionally, while the recessed channel 78 is illustrated as being arcuate/semi-circular in cross-section, the bottom of the channel can alternatively be planar with the sidewalls of the channel extending orthogonally from the planar bottom wall.

The second tab portion 74 is spaced apart from the first tab portion 70 to define therebetween a space or gap into which the tab portion 38 of the base 22 is positioned. The second tab portion 74 has an inwardly-facing surface 86 in facing relation to the inwardly-facing surface 80 of the first tab portion 70 to define therebetween the gap for receiving the tab portion 38 of the base. Both tab portions 70, 74 include a hole 88 for receiving the screw 62, and the distal ends of the tab portions 70, 74 are rounded or arcuate to facilitate rotation of the joint 10. In the illustrated embodiments, the first and second tab portions 70, 74 are made of plastic and can deflect when a nut 90 (see FIG. 7) is tightened on the screw 62. By tightening the nut 90 when the tab portion 38 is positioned between the first and second tab portions 70, 74, the tab portions 70, 74 deflect inwardly or together, thereby sandwiching the tab portion 38 and creating frictional engagement between the inwardly-facing surfaces 80, 86 and the sides 42 (and also the projection 50) to thereby secure the relative positions of the base 22 and the head 26 about the joint 10. Tightening or loosening the screw 62 and nut 90 varies the pressure between the tab portions 38, 70, and 74 to vary the joint's resistance to movement.

Figure 7:
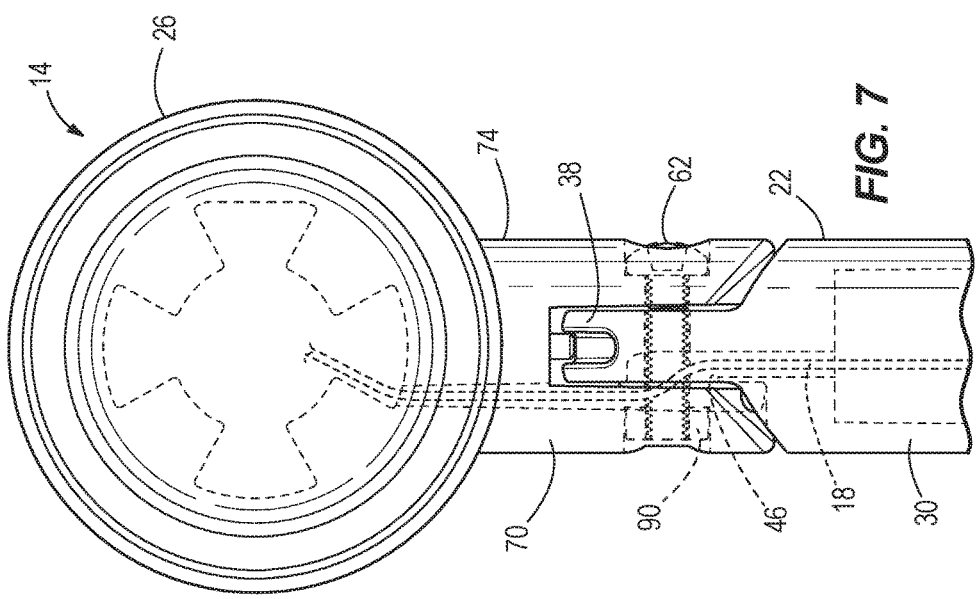
FIG. 7 is side view of the electronic device of FIG. 1, illustrating the wire path through the movable joint.
Figure 9:
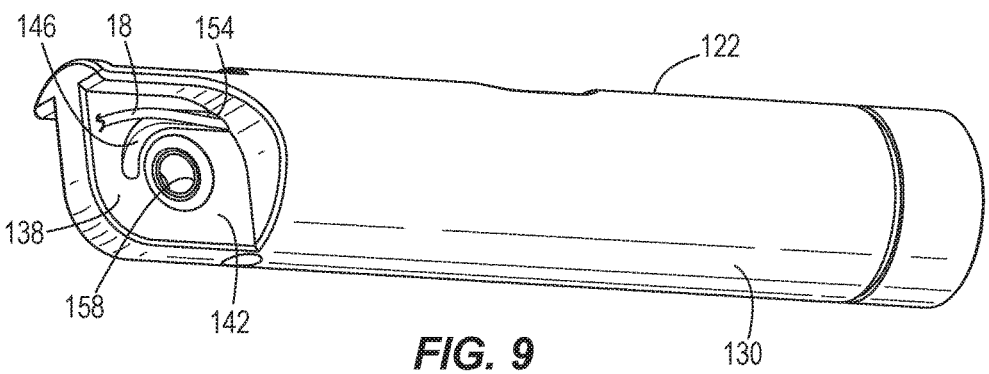
FIG. 9 is a perspective view of the first joint component of FIG. 8.
Figure 10:
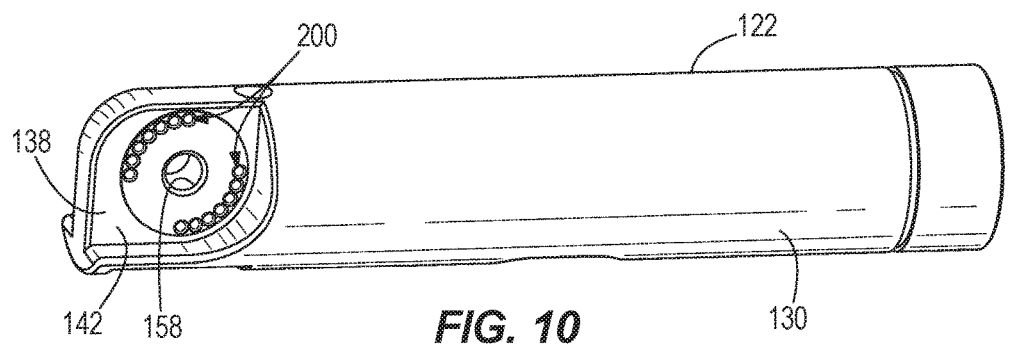
FIG. 10 is another perspective view of the first joint component of FIG. 8.

However, the recessed channels 46 and 78 together provide space to contain the wire lead so that the wire lead is not damaged due to the tight fit between the engaged tab portions 38, 70, and 74. FIG. 7 illustrates the path of the wire leads 18. The illustrated recessed channels 46 and 78 are at least partially aligned or overlapping so that the wire leads 18 can pass freely between the otherwise tightly-engaged portions of the side 42 and the surfaces 80, 86. This prevents excessive pinching of the wire leads 18, which could damage the leads, and prevents obstructions or the hindering of relative movement between the components 22, 26. Additionally, because the recessed channels 46, 78 are spaced from the screw 62, the wire lead is protected even during rotation/manipulation of the joint 10. The ninety-degree bend of the recessed channel 46 provides for guidance and constraint of the wire lead in any of the relative joint positions attainable between the base 22 and the head 26, while the projection 50 and its contour matching the bend angle of the recessed channel 46 further prevents the wire lead from coming out of the recessed channel 46 and/or coming into contact with the screw 62.

It should be noted that the illustrated microphone 14 has recessed channels 46, 78 formed in tab portions of both the base 22 and the head 26, however, in other embodiments, it may be possible to have a recessed channel in only one of the base 22 or the head 26. Additionally, for devices that may require more sets of wire leads spanning the joint, it is also possible to include additional recessed channels on the other side 42 of the tab portion 38 and/or in the second tab portion 74. Furthermore, while the illustrated embodiment depicts the head 26 having two tab portions 70, 74 and the base 22 having only a single tab portion 38, the arrangement can be reversed such that the base 22 has two tab portions and the head 26 has the single tab portion. In yet another alternative, each of the base 22 and the head 26 could include only a single tab portion (see e.g., FIG. 12). Generally speaking, the joint 10 has first and second joint components 22, 26 moveable relative to one another by rotation about the pivot member 62 in a plane normal to the pivot member 62, with the wire leads 18 spanning the joint 10 between two engaged tab portions 38, 70. The wire leads are protected and hidden from view from the outside of the joint 10.

FIGS. 8-11 illustrate a second embodiment of a microphone 114 that is an Electro-Voice ND66 microphone. Similar parts have been labeled with like reference numbers of the 100 series. The inventive joint 110 enables a very slim joint design, that also incorporates a convenient position changing and setting arrangement. As illustrated, the base 122 includes a body portion 130 and a tab portion 138. A first side 142 (see FIG. 9) of the tab portion 138 includes a recessed channel 146 formed in or defined by a surface thereof and communicating with an aperture 154 providing access into the hollow portion (not shown) of the body portion 130. Unlike the tab portion 38, the tab portion 138 does not include a projection. The opposite side 142 (see FIG. 10) of the tab portion 138 includes a plurality of locating holes 200 spaced in an array about the hole 158 to provide for a predetermined number of pre-set angular/rotational positions for the joint 110.

Figure 11:
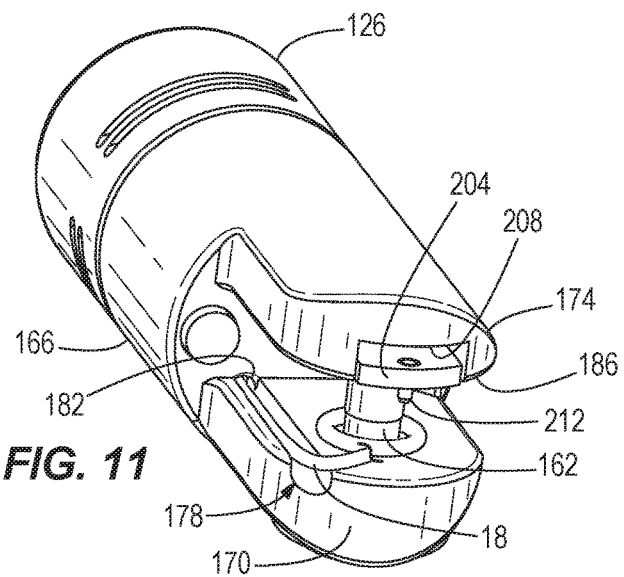
FIG. 11 is a perspective view of the second joint component of FIG. 8.

As best shown in FIG. 11, the head 126 includes first and second tab portions 170, 174 that are spaced apart to receive the tab portion 138 therebetween in a relatively close or tight fit to form the joint 110. The first tab portion 170 includes a recessed channel 178 that communicates with an aperture 182 granting access into the hollow interior (not shown) of the head 126. The pivot member 162 takes the form of a pin having a movable head 204 at one end (e.g., either integrally formed with or coupled thereto) positioned in a recess 208 in the inwardly-facing surface 186 of the second tab portion 174. The head 204 is biased (e.g., by a spring) in a direction toward the first tab portion 170 and has formed or mounted thereon at least one locating pin 212 sized and configured to be removably received within the various locating holes 200 on the tab portion 138. The end of the pin 162 opposite the movable head 204 either defines on its own, or has coupled thereto, a pushbutton 216 which a user can depress to change the relative pivot/swivel position of the joint 110. When the pushbutton 216 is depressed, the movable head 204 moves away from the first tab portion 170, thereby moving the locating pin 212 out of the locating hole 200 in which it was previously positioned. With the locating pin 212 removed from the locating hole 200, the base 122 and the head 126 are free to pivot about the pin 162 relative to one another. Once the desired position of the joint 110 is obtained, the user releases the pushbutton 216, thereby allowing the movable head 204 to move toward the first tab portion 170, bringing the locating pin 212 into one of the locating holes 200 associated with that joint position. The joint 110 is thereby secured against further relative movement until the user depresses the pushbutton 216 again.

The use of the recessed channels 146, 178 again provides space to contain the wire lead 18 so that the wire lead is not damaged due to the tight fight between the tab portions 138, 170, and 174. The illustrated recessed channels 46 and 78 are at least partially aligned or overlapping so that the wire lead 18 can pass freely between the otherwise tightly-engaged portions of the side 142 and the surface 186. This prevents excessive pinching of the wire lead 18, which could damage the lead, and prevents obstructions or the hindering of relative movement between the components 122, 126. Additionally, because the recessed channels 146, 178 are spaced from the pin 162, the wire lead 18 is protected even during rotation/manipulation of the joint 110. The ninety-degree bend of the recessed channel 146 provides for guidance and constraint of the wire lead 18 in any of the relative joint positions attainable between the base 122 and the head 126. Furthermore, the recessed channels 146, 178 and their ability to contain and protect the wire lead 18, facilitate the use of the position changing and setting arrangement described for this embodiment.

Figure 12:
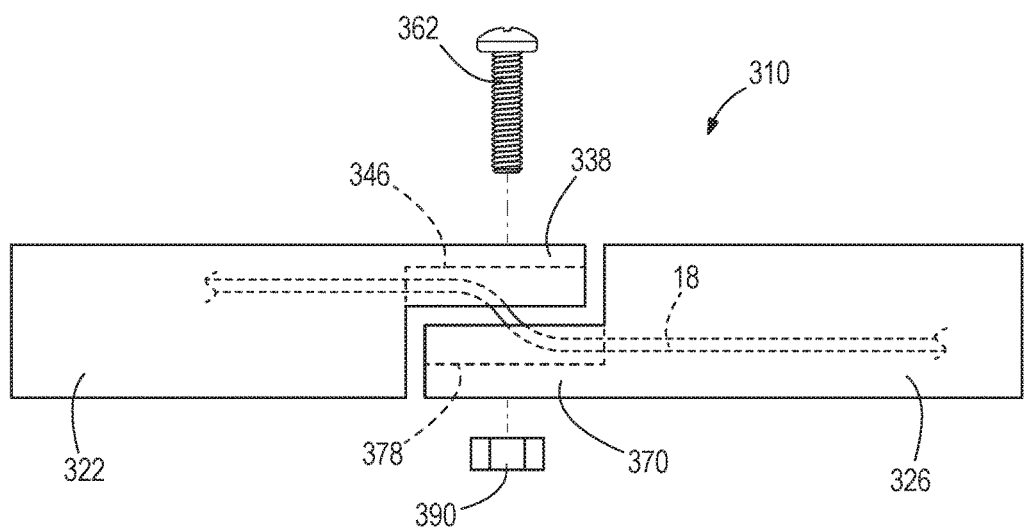
FIG. 12 is a schematic view of yet another embodiment of a movable joint embodying the invention.

FIG. 12 schematically illustrates yet another joint embodiment 310 in which the first and second joint components 322, 326 each only have one tab portion 338, 370. In this construction, each tab portion 338, 370 can include a recessed channel 346, 378 like those shown and described in the above embodiments to contain the wire lead 18. A pivot member 362, which can be a screw, can secure the two tab portions 338, 370 together using a nut 390 for selective pivotal joint positioning. As with the joints 10 and 210, the joint 310 has first and second joint components 322, 326 moveable relative to one another by rotation about the pivot member 362 in a plane normal to the pivot member.

Various features and advantages of the invention are set forth in the following claims.

What is claimed is:

1. A movable joint for an electronic device, the joint comprising:
   a first joint component having a body portion that encloses a wire lead and a tab portion coupled to the body portion;
   a second joint component having a body portion that encloses the wire lead and first and second tab portions coupled to the body portion and spaced apart from one another, the tab portion of the first joint component positioned between the first and second tab portions of the second joint component; and
   a pivot member interconnecting the tab portions of the first and second joint components to enable selective movement between the first and second joint components;
   wherein the first tab portion of the second joint component has an inwardly-facing surface with an elongated, linearly-extending recessed channel formed therein at a location offset to one side of the pivot member, and the tab portion of the first joint component has a side in facing relation to the inwardly-facing surface of the first tab portion and with a recessed channel formed therein;
   wherein the inwardly-facing surface of the first tab of the second joint component engages the side of the tab portion of the first joint component, and wherein the inwardly-facing surface of the first tab portion of the second joint component is uninterrupted except for the recessed channel and a hole for receiving the pivot member; and
   wherein the wire lead spans the movable joint between the inwardly-facing surface of the first tab portion of the second joint component and the side of the tab portion of the first joint component, with the wire lead at least partially positioned in each of the recessed channels.

2. The movable joint of claim 1, wherein each recessed channel communicates with an aperture providing access for the lead to extend into the body portion of the respective joint component containing the recessed channel.

3. The movable joint of claim 1, wherein the recessed channel in the tab portion of the first joint component defines a ninety-degree bend about the pivot member.

4. The movable joint of claim 3, further comprising a projection extending from the side of the tab portion of the first joint component containing the recessed channel, the projection being adjacent the recessed channel and being contoured to match the bend angle of the recessed channel.

5. The movable joint of claim 1, wherein the pivot member is a screw.

6. The movable joint of claim 1, wherein the pivot member is a pin.

7. The movable joint of claim 1, wherein the second joint component further includes a pushbutton configured to be depressed by a user to permit selective movement of the joint.

8. The movable joint of claim 7, wherein the pushbutton is operable to move a locating pin into and out of one of a plurality of recesses formed in the tab portion of the first joint component to provide a plurality of predetermined relative positions between the first and second joint components.

9. The moveable joint of claim 8, wherein the plurality of recesses are on a first side of the tab portion of the first joint component, and wherein a second side of the tab portion of the first joint component is the side that includes the recessed.

10. The movable joint of claim 9, wherein the recessed channel in the tab portion of the first joint component communicates with an aperture providing access for the lead to extend into the body portion of the first joint component.

11. The movable joint of claim 1, wherein the pivot member is a screw, and wherein a nut is tightened on the screw to deflect the two tab portions of the second joint component towards one another such that frictional engagement between the tab portions of the first and second joint components secures the first and second joint components in position relative to one another.

12. The movable joint of claim 1, wherein the pivot member is a pin having a movable head received in one tab portion of the second joint component, the movable head supporting a locating pin, and wherein the tab portion of the first joint component includes a plurality of recesses into which the locating pin can be selectively positioned to secure the first and second joint components in position relative to one another.

13. The movable joint of claim 12, wherein the pin includes a pushbutton portion on an end opposite the movable head such that pressing on the pushbutton portion moves the movable head.

14. The movable joint of claim 13, wherein the locating pin withdraws out of one of the plurality of recesses in a direction perpendicular to the inwardly-facing surface of the first tab portion when the pushbutton is pressed.

15. The movable joint of claim 13, wherein the recessed channel in the inwardly-facing surface extends to an end of the first tab portion of the second joint component.

16. The movable joint of claim 1, wherein the first and second joint components are moveable relative to one another by rotation about the pivot member in a plane normal to the pivot member.

17. The movable joint of claim 1, wherein the recessed channel in the first tab portion of the second joint component and the recessed channel in the tab portion of the first joint component at least partially align with one another between the inwardly-facing surface and the side of the tab portion of the first joint component.

18. The movable joint of claim 1, wherein the recessed channel in the inwardly-facing surface extends to an end of the first tab portion of the head.

19. A microphone having a movable joint, the microphone comprising:

- a base having a body portion that encloses a wire lead and a tab portion coupled to the body portion;
- a head having a body portion that encloses the wire lead and first and second tab portions coupled to the body portion and spaced apart from one another, the tab portion of the base positioned between the first and second tab portions of the head; and
- a pivot member interconnecting the tab portions of the base and the head to create the moveable joint to enable selective movement between the base and the head;
- wherein the first tab portion of the head has an inwardly-facing surface with an elongated, linearly-extending recessed channel formed therein at a location offset to one side of the pivot member, and the tab portion of the base has a side in facing relation to the inwardly-facing surface of the first tab portion and with a recessed channel formed therein;
- wherein the inwardly-facing surface of the first tab portion of the head engages the side of the tab portion of the base, and wherein the inwardly-facing surface of the first tab portion of the head is uninterrupted except for the recessed channel and a hole for receiving the pivot member; and
- wherein the wire lead spans the movable joint between the inwardly-facing surface of the first tab portion of the head and the side of the tab portion of the base, with the wire lead at least partially positioned in each of the recessed channels.

20. The microphone of claim 19, wherein the recessed channel in the first tab portion of the head and the recessed channel in the tab portion of the base at least partially align with one another between the inwardly-facing surface and the side of the tab portion of the base.

* * * * *